(12) United States Patent
Batra

(10) Patent No.: US 6,574,072 B1
(45) Date of Patent: Jun. 3, 2003

(54) PERPENDICULAR MAGNETIC RECORDING HEAD WITH RADIAL MAGNETIC FIELD GENERATOR WHICH REDUCES NOISE FROM SOFT MAGNETIC UNDERLAYER OF RECORDING DISK

(75) Inventor: Sharat Batra, Wexford, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 120 days.

(21) Appl. No.: 09/759,948

(22) Filed: Jan. 12, 2001

Related U.S. Application Data

(60) Provisional application No. 60/175,859, filed on Jan. 12, 2000.

(51) Int. Cl.$^7$ .............................................. G11B 5/127
(52) U.S. Cl. ....................................................... 360/125
(58) Field of Search ................................ 360/125, 123, 360/121

(56) References Cited

U.S. PATENT DOCUMENTS

| | | |
|---|---|---|
| 4,138,702 A | 2/1979 | Magnenet |
| 4,410,603 A | 10/1983 | Yamamori et al. |
| 4,438,471 A | 3/1984 | Oshiki et al. |
| 4,541,026 A | 9/1985 | Bonin et al. |
| 4,546,398 A | 10/1985 | Toda et al. |
| 4,575,777 A | 3/1986 | Hosokawa |
| 4,613,918 A | 9/1986 | Kanai et al. |
| 4,629,660 A | 12/1986 | Sagoi et al. |
| 4,649,449 A | 3/1987 | Sawada et al. |
| 4,652,956 A | 3/1987 | Schewe |
| 4,731,157 A | 3/1988 | Lazzari |
| 4,742,413 A | 5/1988 | Schewe |
| 4,751,598 A | 6/1988 | Hamilton |
| 4,771,350 A | 9/1988 | Deserre |
| 4,897,749 A | 1/1990 | Perlov et al. |
| 4,943,882 A | 7/1990 | Wada et al. |
| 4,974,110 A | 11/1990 | Kanamine et al. |
| 5,003,423 A * | 3/1991 | Imamura et al. ............ 360/125 |
| 5,057,957 A | 10/1991 | Ito et al. |
| 5,073,836 A | 12/1991 | Gill et al. |
| RE33,949 E | 6/1992 | Mallary et al. |
| 5,195,005 A | 3/1993 | Mallary et al. |
| 5,196,976 A | 3/1993 | Lazzari |
| 5,225,953 A | 7/1993 | Wada et al. |
| 5,311,386 A | 5/1994 | Mallary |
| 5,333,086 A | 7/1994 | Frey et al. |
| 5,396,391 A | 3/1995 | Tanaka et al. |
| 5,436,779 A | 7/1995 | Valstyn |
| 5,738,927 A | 4/1998 | Nakamura et al. |
| 5,815,909 A | 10/1998 | Gray |
| 5,942,342 A | 8/1999 | Hikosaka et al. |
| 6,008,969 A | 12/1999 | Imai et al. |
| 6,118,625 A * | 9/2000 | Heinz et al. ................. 360/121 |

OTHER PUBLICATIONS

U.S. patent application Ser. No. 09/757,432, filed Jan. 10, 2001, Khizroev et al.

* cited by examiner

*Primary Examiner*—Robert S. Tupper
(74) *Attorney, Agent, or Firm*—Alan G. Towner, Esq.; Pietragallo, Bosick & Gordon

(57) ABSTRACT

The present invention provides a modified perpendicular magnetic recording head which generates a relatively small magnetic field in a radial direction through the soft underlayer of a magnetic recording disk in order to reduce unwanted noise from the underlayer. The radial magnetic field is sufficiently strong to effectively drive the magnetic domains out of the soft underlayer underneath the head.

23 Claims, 3 Drawing Sheets

PERPENDICULAR MAGNETIC RECORDING HEAD WITH RADIAL MAGNETIC FIELD GENERATOR WHICH REDUCES NOISE FROM SOFT MAGNETIC UNDERLAYER OF RECORDING DISK

CROSS REFERENCE TO RELATED APPLICATION

This application claims the benefit of U.S. Provisional Patent Application Serial No. 60/175,859 filed Jan. 12, 2000.

FIELD OF THE INVENTION

The present invention relates to perpendicular magnetic recording heads, and more particularly relates to a recording head including a radial magnetic field generator which reduces unwanted noise from the soft magnetic underlayer of the recording disk.

BACKGROUND INFORMATION

Perpendicular magnetic recording systems have been developed for use in computer hard disk drives. A preferred approach to perpendicular magnetic recording requires the use of a magnetically soft underlayer media which provides a flux path from the trailing pole to the leading pole of the writer. The soft underlayer helps with sharp field gradients and also provides strong fields which enable writing on high coercivity media. The soft underlayer is also required during the read operation. During the read back process, the soft underlayer produces the image of magnetic charge, effectively increasing the magnetic flux coming from the media. This provides a higher signal-to-noise ratio. The magnetic anisotropy ($H_k$) of the soft underlayer can be tailored, typically around 50–100 Oe. This means that a field of approximately 50–100 Oe needs to be applied for the soft underlayer to saturate in the circumferential direction along the length of the recording track. The $H_k$ of the hard magnetic recording layer is typically about 5,000–20,000 Oe.

One of the challenges of implementing perpendicular recording is to resolve the problem of soft underlayer noise. The noise is caused by domain wall motion or fringing fields generated by magnetic domains in the soft underlayer that can be sensed by the reader. For the write process to be efficient, high moment materials, e.g., $B_s > 20$ kG, may be used for the soft underlayer. If the domain distribution of such materials is not carefully controlled, very large fringing fields can introduce substantial amounts of noise in the read element. Not only can the reader sense the steady-state distribution of magnetization in the soft underlayer, but it can also affect the distribution of magnetization in the soft underlayer, thus generating time-dependent noise. Both types of noise should be minimized.

The present invention has been developed in view of the foregoing.

SUMMARY OF THE INVENTION

The present invention provides a modified perpendicular magnetic recording head which generates a relatively small magnetic field in a radial direction through the soft underlayer of a magnetic recording disk. The radial magnetic field is typically on the order of from about 5 to about 30 Oe, enough to effectively drive the magnetic domains out of the soft underlayer underneath the head. The radial magnetic field is preferably generated in the soft underlayer of the media during the read operation, and may also be generated during the write operation.

An aspect of the present invention is to provide a perpendicular magnetic recording head including at least one magnetic recording element, and means for generating a magnetic field which reduces soft magnetic underlayer noise during operation of the magnetic recording element.

Another aspect of the present invention is to provide a perpendicular magnetic recording head including at least one magnetic recording element, and a radial magnetic field generator having arms extending along opposing sides of the recording head and spaced apart from the at least one magnetic recording element.

A further aspect of the present invention is to provide a perpendicular magnetic recording system comprising a perpendicular magnetic recording disk and a perpendicular magnetic recording head. The disk includes a hard magnetic recording layer and a soft magnetic underlayer, while the perpendicular magnetic recording head includes at least one magnetic recording element and a radial magnetic field generator.

These and other aspects of the present invention will be more apparent from the following description.

DETAILED DESCRIPTION

Figure 1:
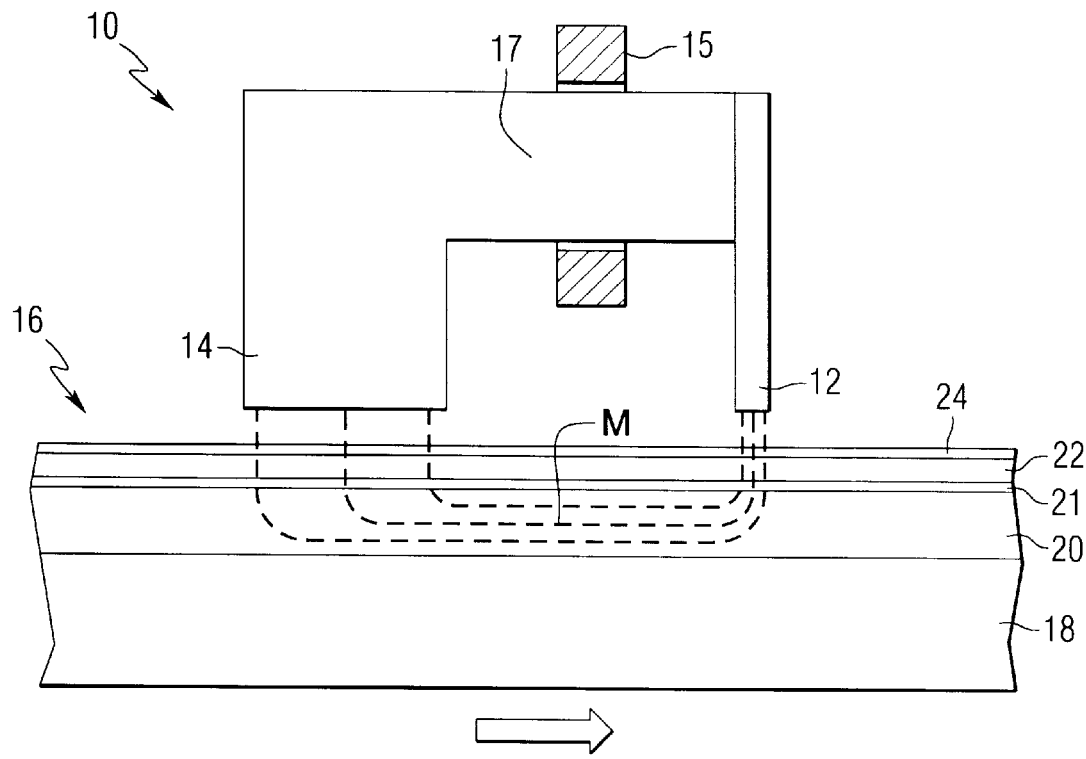
FIG. 1 is a partially schematic side view of a perpendicular magnetic recording head and recording disk illustrating the magnetic flux path through the soft underlayer of the disk during the recording operation.

FIG. 1 is a partially schematic side view of a perpendicular magnetic recording head 10. The recording head 10 includes a trailing main write pole 12 and a return pole 14. A magnetizing coil 15 surrounds a yoke 17 which connects the write pole 12 and return pole 14. A perpendicular magnetic recording medium 16 such as a disk is positioned under the recording head 10. The recording medium 16 travels in the direction of the arrow shown in FIG. 1 during recording. The recording medium 16 includes a substrate 18, which may be made of any suitable material such as ceramic glass, amorphous glass or NiP plated AlMg. A magnetically soft underlayer 20 is deposited on the substrate 18. Suitable soft magnetic materials for the underlayer 20 include CoFe and alloys thereof, Fe and alloys thereof, FeAlN, NiFe, CoZrNb and FeTaN, with CoFe and FeAlN being preferred soft materials. A thin exchange decouple layer 21 made of a non-magnetic material such as CoCr, Cr or an oxide is deposited on the soft underlayer 20. A magnetically hard perpendicular recording layer 22 is deposited on the exchange decouple layer 21. Suitable hard magnetic materials for the recording layer 22 include multi-layers of Co/Pd or Co/Pt, L10 phases of CoPt, FePt, CoPd and FePd and hcp Co alloys, with such multi layers and L10 phases being preferred hard materials. A protective overcoat 24 such as diamond-like carbon may be applied over the recording layer 22. As shown in FIG. 1, during writing operations, magnetic flux is directed along a path M from the main pole 12 perpendicularly through the recording layer 22, then in the plane of the soft underlayer 20 back to the return pole 14.

Figure 2:
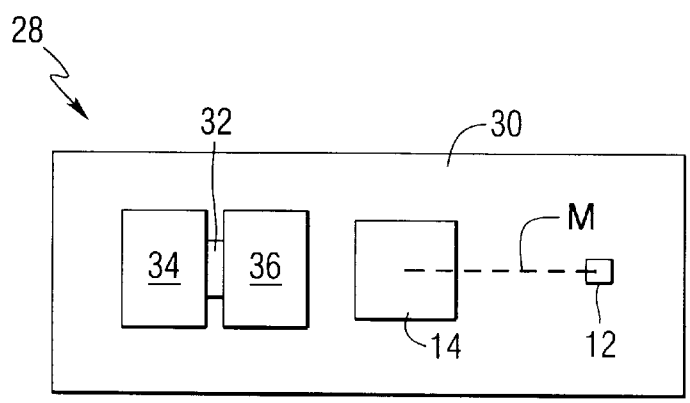
FIG. 2 is a partially schematic bottom view showing the air bearing surface of a perpendicular magnetic recording head which includes both writing and reading elements.

FIG. 2 is a partially schematic bottom view of a read/write perpendicular recording head 28 which may be modified in accordance with the present invention. The perpendicular read/write head 28 includes an air bearing surface (ABS) 30 which may be flush with the ends of the main write pole 12 and return pole 14. In addition to the write poles 12 and 14, the perpendicular recording head 28 shown in FIG. 2 includes a reader section comprising a read element 32 positioned between shields 34 and 36. Alternatively, the pole 14 may be combined with the shield 36. The read element 32 may be a conventional GMR reader or the like. As shown in FIG. 2, during the writing operation, the magnetic flux path M travels from the main pole 12 to the return pole 14.

Figure 3:
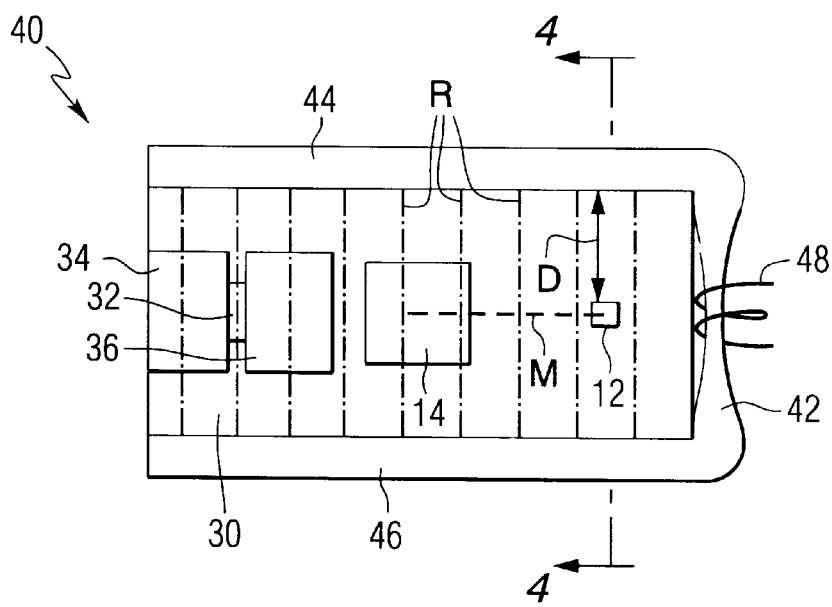
FIG. 3 is a partially schematic bottom view showing the air bearing surface of a perpendicular magnetic recording head including a radial magnetic field generator in accordance with an embodiment of the present invention.

FIG. 3 is a partially schematic bottom view of a perpendicular magnetic recording head 40 in accordance with an embodiment of the present invention. The recording head 40 includes perpendicular read/write elements adjacent an air bearing surface 30, similar to the conventional design shown in FIG. 2. In addition, the recording head 40 of the present invention includes a transverse or radial magnetic field generator 42 comprising arms 44 and 46 which extend along the sides of the recording head 40 substantially flush with the air bearing surface 30. A coil 48 is wound around a narrowed portion of the base of the radial magnetic field generator 42. The arms 44 and 46 of the magnetic field generator 42 may be made of any suitable magnetically permeable material such as NiFe, NiFeCo, FeCoB, FeAlN or the like. The coil 48 may be made of any suitable electrically conductive material such as Cu, CrCu, Au or the like.

The coil 48 may have any suitable number of turns, e.g., one, two, three or more. For many designs, one or two coil turns are sufficient when currents on the order of 5 to 10 mA are applied to the coil 48. As shown in FIG. 3, when the coil 48 is activated, a transverse or radial flux pattern R is generated between the arms 44 and 46. The radial magnetic flux pattern R is substantially perpendicular to the magnetic flux path M between the write poles 12 and 14.

Figure 4:
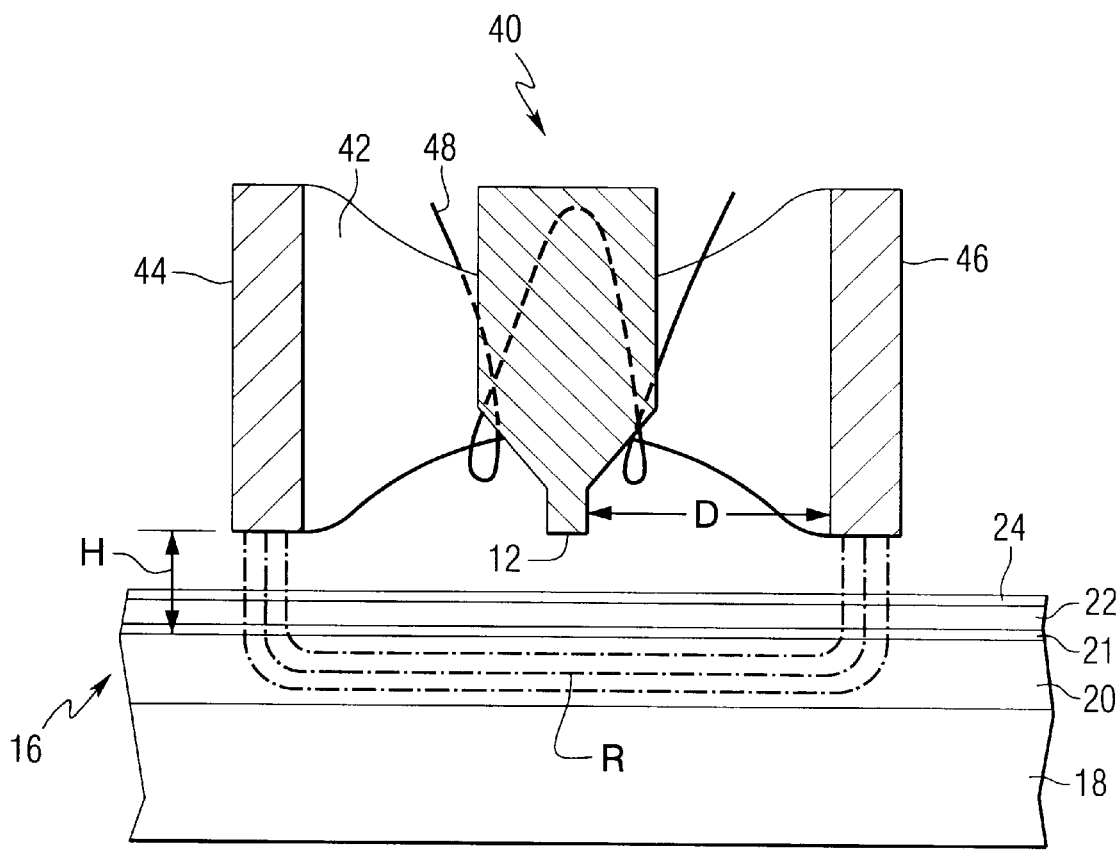
FIG. 4 is a partially schematic cross-sectional end view taken through section 4—4 of FIG. 3, illustrating the recording disk and perpendicular magnetic recording head including a radial magnetic field generator in accordance with an embodiment of the present invention.

FIG. 4 is a partially schematic cross-sectional end view of the perpendicular magnetic recording head 40 taken through section 4—4 of FIG. 3. For purposes of clarity, only the main pole 12 and the radial flux generator 42, 44 and 46 are shown in FIG. 4. The perpendicular recording medium 16 is positioned under the recording head 40 and travels in a direction perpendicular to the plane of FIG. 4. The radial magnetic field R travels through the soft underlayer 20 between the arms 44 and 46 of the magnetic field generator 42. The distance between the arms 44 and 46 may be from about 2 to about 100 microns, for example, from 5 to about 20 microns. The cross-sectional area of each arm may be from about 2 to about 50 square microns, for example, from about 5 to about 20 square microns. As shown in FIG. 4, the arms 44 and 46 may relatively tall and thin. For example, the widths of the arms 44 and 46 may be about 1 micron, while their heights may be from about 5 to 10 micron.

In accordance with the present invention, the distance between each of the arms 44, 46 and the read/write components 12, 14, 34 and 36 is relatively large in comparison with the distance between each of the arms 44, 46 and the soft underlayer 20 of the disk 16. This ensures that the radial magnetic field R will follow the path of smallest reluctance through the soft underlayer 20. For example, the distance D shown in FIG. 3 between the arm 44 and the main pole 12 is much larger than the distance H shown in FIG. 4 between the arm 44 and the soft underlayer 20. The ratio of D:H may be from about 5:1 to about 50:1. As a particular example, the distance D may be from about 400 to about 500 nm, while the distance H may be from about 40 to about 50 nm. However, the specific distances may vary depending upon the design of the particular recording head.

Figure 5:
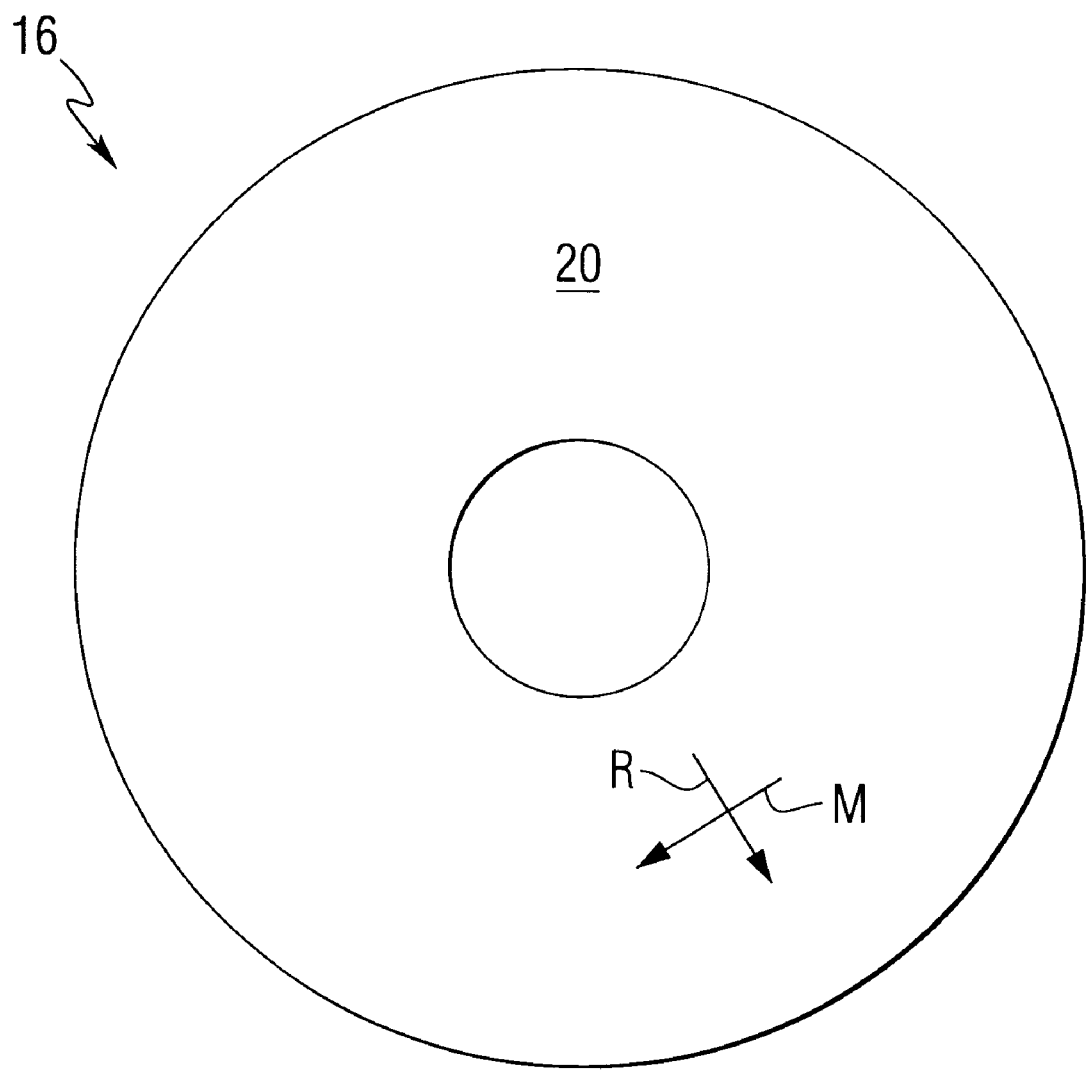
FIG. 5 is a top view of a magnetic recording disk, schematically illustrating the direction of the magnetic field generated in the soft magnetic underlayer of the disk along the direction of a recording track during the writing operation, and a radial magnetic field generated in the soft underlayer which reduces noise in accordance with an embodiment of the present invention.

FIG. 5 is a top view illustrating the soft underlayer 20 of the magnetic recording disk 16. The magnetic field M generated by the perpendicular recording head travels through the soft magnetic underlayer 20 along the direction of the recording tracks of the disk 16 during writing operations. The radial magnetic field R generated in the soft underlayer in accordance with the present invention may be substantially perpendicular to the magnetic field M. The strength of the radial magnetic field R in the soft underlayer 20 is substantially less than the strength of the recording magnetic field M. For example, the radial magnetic field R may be at least 100 times smaller than the recording field M, or at least 1,000 times smaller. For example, the radial magnetic field R may range from about 5 to about 20 or 30 Oe, while the recording magnetic field M may range from about 5,000 to about 20,000 Oe. The radial field R may be smaller than the $H_k$ of the soft underlayer, which typically has a magnetic anisotropy of 50 to 100 Oe.

The head structure of the present invention may be built using conventional read and write head fabrication processes, with the additional formation of a shielded structure to provide the radial magnetic field R. To accomplish this, a conventional head structure may be encapsulated with an insulating material such as $Al_2O_3$ after the read/write elements have been deposited, e.g., after the main pole 12 of the writer is deposited. The radial magnetic field generator 42, 44 and 46 may then be deposited over the insulating material by techniques such as electroplating or sputtering. Alternatively, the radial magnetic field generator 42, 44 and 46 may be built up section-by-section at the same time as the individual read/write layers are deposited by conventional masking techniques. For example, in FIG. 3, the reader shield 34 may initially be deposited on a substrate (not shown) and portions of the arms 44 and 46 may be deposited on the substrate up to the level of the shield 34. Then the reader 32 may be deposited, followed by deposition of additional layers of the arms 44 and 46 up to the level of the reader 32. The other layers of the head 40 are subsequently deposited in a similar manner, thereby building up the arms 44, 46 and the base of the radial magnetic field generator 42 layer by layer. The coil 48 can be formed as either a standard solenoidal or pancake coil around the base 42.

Whereas particular embodiments of this invention have been described above for purposes of illustration, it will be evident to those skilled in the art that numerous variations of the details of the present invention may be made without departing from the invention as defined in the appended claims.

What is claimed is:

1. A perpendicular magnetic recording head comprising:
   at least one magnetic recording element; and
   means for generating a magnetic field which reduces noise from a soft magnetic underlayer of a recording disk during operation of the magnetic recording element.

2. The perpendicular magnetic recording head of claim 1, wherein the means for generating a magnetic field comprises arms extending along opposing sides of the recording head and spaced apart from the at least one magnetic recording element, and a magnetizing coil structured and arranged to induce magnetic flux through the arms.

3. The perpendicular magnetic recording head of claim 2, wherein the means for generating a magnetic field further comprises a base connecting the arms.

4. The perpendicular magnetic recording head of claim 3, wherein the magnetizing coil at least partially surrounds the base.

5. A perpendicular magnetic recording head comprising:
at least one magnetic recording element; and
a radial magnetic field generator including arms extending along opposing sides of the recording head and spaced apart from the at least one magnetic recording element, and a magnetizing coil structured and arranged to induce magnetic flux through the arms.

6. The perpendicular magnetic recording head of claim 5, wherein the arms have lower surfaces which are substantially flush with an air bearing surface of the recording head.

7. The perpendicular magnetic recording head of claim 5, wherein the at least one recording element is a reader.

8. The perpendicular magnetic recording head of claim 7, wherein the reader is located between the arms.

9. The perpendicular magnetic recording head of claim 5, wherein the radial magnetic field generator comprises a base connecting the arms.

10. The perpendicular magnetic recording head of claim 9, wherein the base and arms are generally U-shaped.

11. The perpendicular magnetic recording head of claim 9, wherein the base extends in a direction substantially perpendicular to the arms.

12. The perpendicular magnetic recording head of claim 9, wherein the magnetizing coil at least partially surrounds the base.

13. The perpendicular magnetic recording head of claim 5, wherein the arms comprise at least one magnetically permeable material selected from NiFe, NiFeCo, FeCoB and FeAlN.

14. A perpendicular magnetic recording system comprising:

a perpendicular magnetic recording disk including a hard magnetic recording layer and a soft magnetic underlayer; and a perpendicular magnetic recording head including at least one magnetic recording element and a radial magnetic field generator, wherein the magnetic field generator comprises arms extending along opposing sides of the recording head and spaced apart from the at least one magnetic recording element, and a magnetizing coil structured and arranged to induce magnetic flux through the arms.

15. The perpendicular magnetic recording system of claim 14, wherein the arms have lower surfaces which are substantially flush with an air bearing surface of the recording head.

16. The perpendicular magnetic recording system of claim 14, wherein the at least one recording element is a reader.

17. The perpendicular magnetic recording system of claim 14, wherein the reader is located between the arms.

18. The perpendicular magnetic recording system of claim 14, wherein the radial magnetic field generator comprises a base connecting the arms.

19. The perpendicular magnetic recording system of claim 18, wherein the magnetizing coil at least partially surrounds the base.

20. The perpendicular magnetic recording system of claim 14, wherein the arms are spaced apart a distance D, the arms are located a distance H above the soft magnetic underlayer, and D is greater than H.

21. The perpendicular magnetic recording system of claim 20, wherein the ratio of D:H is at least about 5:1.

22. The perpendicular magnetic recording system of claim 14, wherein the magnetic field generated in the soft underlayer is substantially perpendicular to a direction of recording tracks in the disk.

23. The perpendicular magnetic recording system of claim 14, wherein the magnetic field generated in the soft underlayer is from about 5 to about 30 Oe.

* * * * *